United States Patent
Tang

(10) Patent No.: US 8,018,113 B2
(45) Date of Patent: Sep. 13, 2011

(54) AC MOTOR WINDING PATTERN

(75) Inventor: Yifan Tang, Los Altos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 316 days.

(21) Appl. No.: 12/383,884

(22) Filed: Mar. 30, 2009

(65) Prior Publication Data

US 2010/0244612 A1    Sep. 30, 2010

(51) Int. Cl.
*H02K 3/00* (2006.01)
(52) U.S. Cl. ......................... 310/198; 310/202; 310/195
(58) Field of Classification Search .................. 310/180, 310/184, 195, 198, 202
See application file for complete search history.

(56) References Cited

U.S. PATENT DOCUMENTS

| | | | | |
|---|---|---|---|---|
| 1,723,912 A | * | 8/1929 | Bergman | 310/176 |
| 3,324,322 A | * | 6/1967 | Johns | 310/198 |

* cited by examiner

*Primary Examiner* — Dang D Le
(74) *Attorney, Agent, or Firm* — Patent Law Office of David G. Beck

(57) ABSTRACT

A motor winding arrangement that is capable of delivering relatively flat torque over a wide range of speeds, thus achieving increasing power throughout its operating range, is provided. In a multi-phase, e.g., three-phase, motor utilizing the winding arrangement of the invention, each winding layer corresponds to one phase of the motor and occupies every slot of the stator. The poles for each winding layer consist of concentric and non-overlapping coils.

12 Claims, 5 Drawing Sheets

AC MOTOR WINDING PATTERN

FIELD OF THE INVENTION

The present invention relates generally to electric motors and, more particularly, to an electric motor design that achieves flat peak torque over a wide range of speeds.

BACKGROUND OF THE INVENTION

The trend towards designing and building fuel efficient, low emission vehicles has increased dramatically over the last decade, with significant emphasis being placed on the development of hybrid and all-electric vehicles. This has led, in turn, to a greater emphasis being placed on electric motors, either as the sole source of propulsion (e.g., all-electric vehicles) or as a secondary source of propulsion in a combined propulsion system (e.g., hybrid or dual electric motor vehicles). Accordingly, what is needed is an electric motor that can provide the desired torque levels and high speed performance. The present invention provides such a motor.

SUMMARY OF THE INVENTION

The present invention provides a motor winding arrangement that is capable of delivering relatively flat torque over a wide range of speeds, thus providing increasing power throughout its operating range.

In a multi-phase, e.g., three-phase, motor utilizing the winding arrangement of the invention, each winding layer corresponds to one phase of the motor. Each winding layer occupies every slot of the stator. The poles of each winding layer are comprised of concentric and non-overlapping coils. Preferably each winding layer utilizes the same number of poles, and more preferably each winding layer utilizes four poles. For each winding layer, the coils comprising one pole are immediately adjacent to, but do not overlap, the coils comprising adjacent poles. Preferably the coils comprising adjacent poles are wound in opposite directions from one another. Preferably each pole of each winding layer, and more preferably all poles for all winding layers, are comprised of the same number of coils. Preferably the number of coils per pole is an even number. In an embodiment in which each pole includes the same number of coils, the number of stator slots may be determined by multiplying twice the number of coils per pole by the number of poles per phase. One preferred embodiment is a three-phase motor utilizing a 48 slot stator and four poles per winding, preferably with each winding comprised of at least two turns.

A further understanding of the nature and advantages of the present invention may be realized by reference to the remaining portions of the specification and the drawings.

DESCRIPTION OF THE SPECIFIC EMBODIMENTS

Figure 1A:
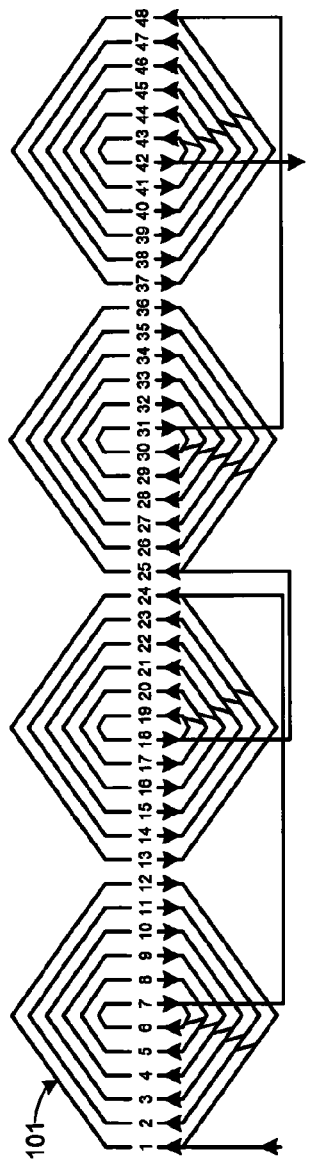
FIG. 1A illustrates the winding diagram for the first winding of a three-phase motor according to a preferred embodiment of the invention.
Figure 1B:
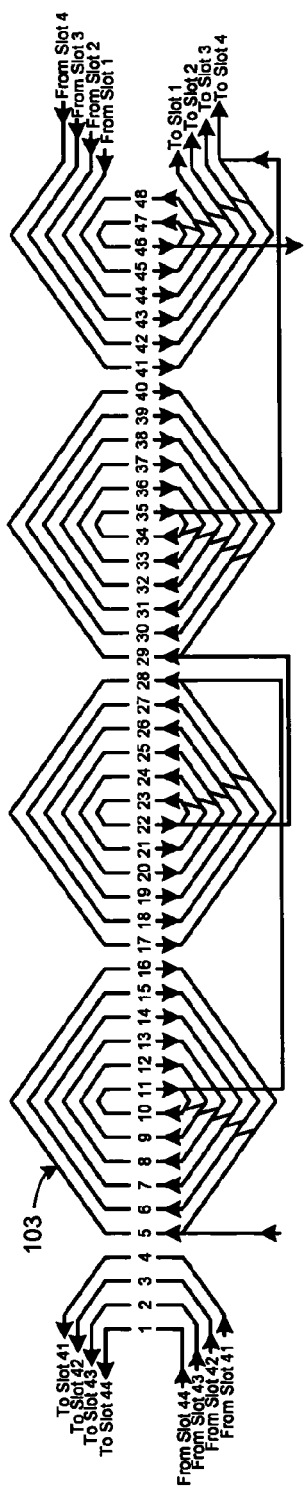
FIG. 1B illustrates the winding diagram for the second winding of a three-phase motor according to a preferred embodiment of the invention.
Figure 1C:
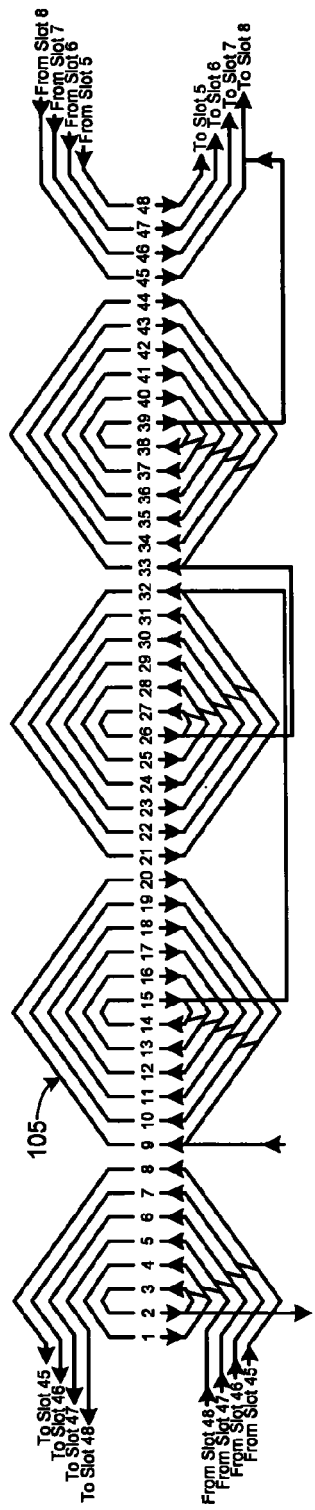
FIG. 1C illustrates the winding diagram for the third winding of a three-phase motor according to a preferred embodiment of the invention.

FIGS. 1A-1C diagrammatically illustrate the arrangement of windings for a preferred embodiment of the invention. In particular, the illustrated arrangement is for a three-phase, four pole motor in which the stator is comprised of 48 slots. Each winding layer constitutes one phase, i.e., windings 101 of the first layer as shown in FIG. 1A comprise a first phase of the motor; windings 103 of the second layer as shown in FIG. 1B comprise a second phase of the motor; and windings 105 of the third layer as shown in FIG. 1C comprise a third phase of the motor.

As illustrated and in accordance with the invention, the coils comprising each pole are concentric and non-overlapping. Thus, for example, in the first pole of the first phase as shown in FIG. 1A, there are six coils such that a first coil is wound in slots 6 and 7; a second coil is wound in slots 5 and 8; a third coil is wound in slots 4 and 9; a fourth slot is wound in slots 3 and 10; a fifth coil is wound in slots 2 and 11; and a sixth coil is wound in slots 1 and 12.

As illustrated and in accordance with another aspect of the invention, the number of slots is selected such that each layer occupies every slot without having any overlap between the coils of adjacent poles. As a result of this aspect of the invention, for a three-phase configuration as illustrated, there are three layers of coils in each slot with each of the three coils representing a different phase. It will be appreciated that if each pole of the motor includes the same number of coils, as preferred, then the number of slots is equivalent to twice the number of coils per pole, $N_C$, multiplied by the number of poles per phase, $N_P$.

Preferably, and as illustrated, for a three-phase design the number of coils per pole is an even number, thus achieving substantially balanced operation.

Preferably, and as illustrated, the number of slots is also selected to insure that each pole of each layer is comprised of the same number of coils. Thus in the exemplary embodiment, each pole of each layer is comprised of six concentric coils.

Preferably, and as illustrated, for each layer the direction of the windings for adjacent poles alternates. Thus in the exemplary embodiment, for the first layer of windings (FIG. 1A), the windings in the first pole, i.e., slots 1-12, and the third pole, i.e., slots 25-36, are wound in the opposite direction from the windings in the second pole, i.e., slots 13-24, and the fourth pole, i.e., slots 37-48. Similarly, for the second layer of windings (FIG. 1B), the windings in the first pole, i.e., slots 5-16, and the third pole, i.e., slots 29-40, are wound in the opposite direction from the windings in the second pole, i.e., slots 17-28, and the fourth pole, i.e., slots 41-4. Similarly, for the third layer of windings (FIG. 1C), the windings in the first pole, i.e., slots 9-20, and the third pole, i.e., slots 33-44, are wound in the opposite direction from the windings in the second pole, i.e., slots 21-32, and the fourth pole, i.e., slots 45-8.

Figure 2:
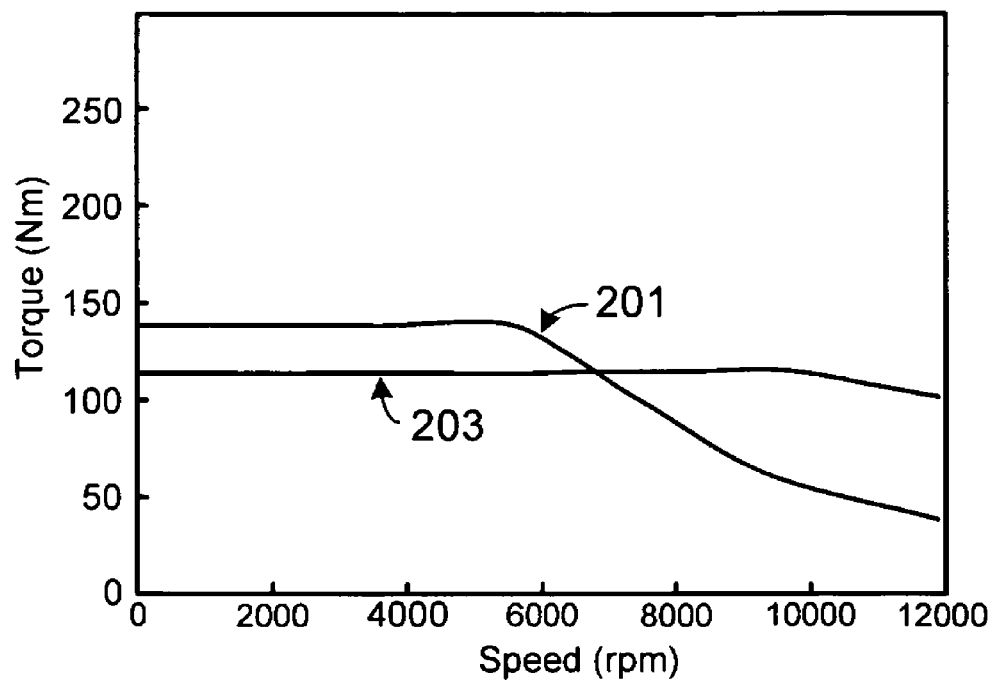
FIG. 2 graphically illustrates the torque curves for the motor described relative to FIGS. 1A-1C and for a conventional motor.
Figure 3:
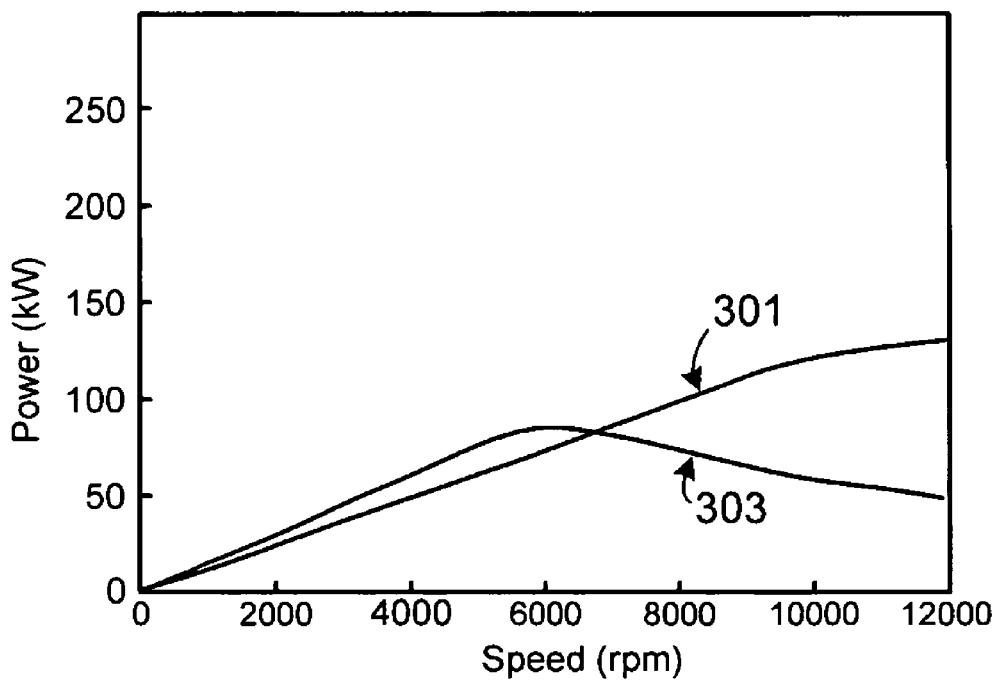
FIG. 3 graphically illustrates the power curves for the motor described relative to FIGS. 1A-1C and for a conventional motor.

In a preferred embodiment of the invention, the winding/layer configuration described above relative to FIGS. 1A-1C is used, with each coil having two turns. FIGS. 2 and 3 graphically illustrate some of the performance differences between motors using a conventional winding design and one using the design described above and illustrated in FIGS. 1A-1C. In the torque curves shown in FIG. 2, curve 201 illustrates the relatively rapid fall-off of the torque curve of a conventional motor starting at around 6000 rpm. In contrast, the torque curve of a motor designed in accordance with the present invention has a very wide range of speeds over which the torque remains flat; basically remaining flat until its maximum operating speed is reached. As a consequence, the power curve of the motor utilizing the new design (curve 301) continues to increase throughout its operating range while the conventionally designed motor starts losing power at the relatively low speed at which the motor's torque begins to fall-off (curve 303).

Figure 4:
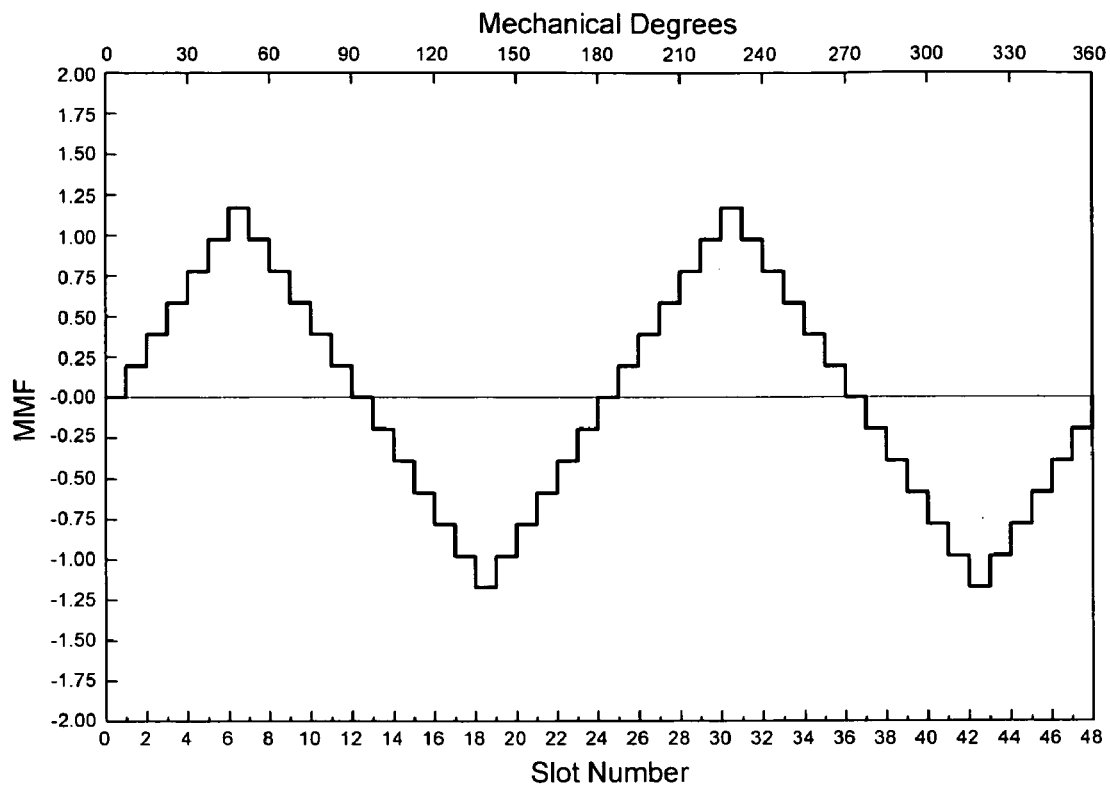
FIG. 4 illustrates the winding MMF of a single phase of the motor described relative to FIGS. 1A-1C.
Figure 5:
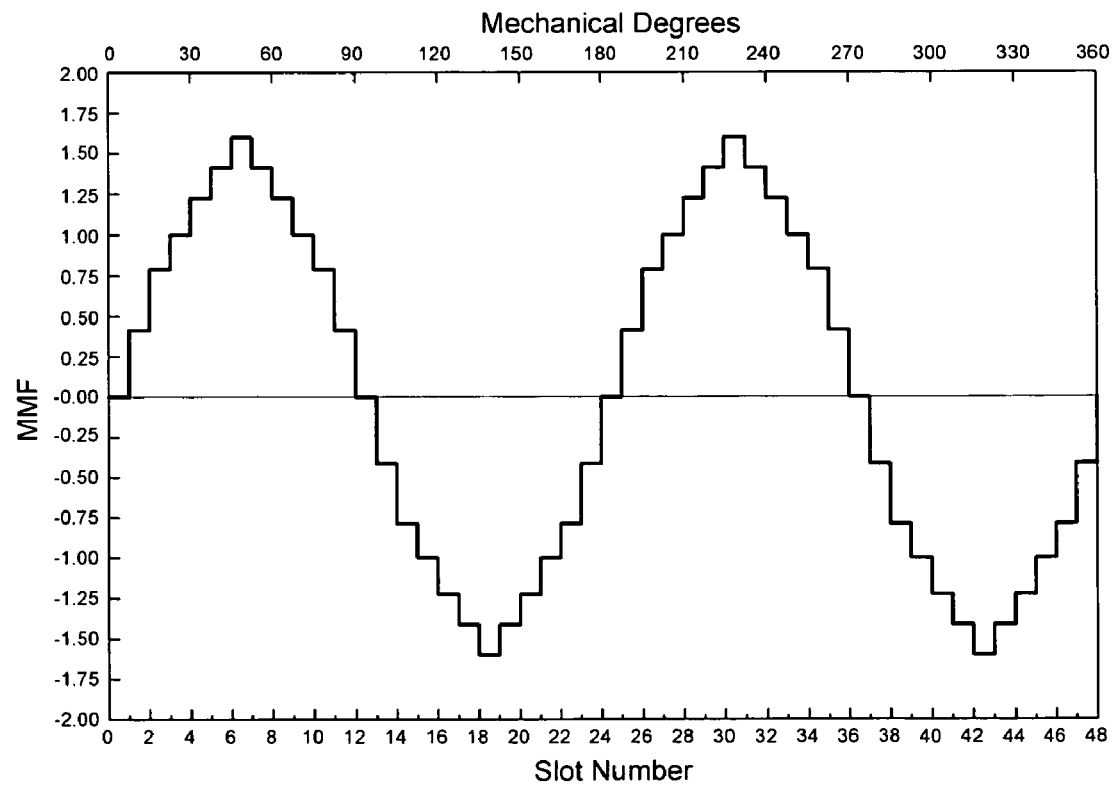
FIG. 5 illustrates the accumulated MMF for all coils of all three-phases of the motor described relative to FIGS. 1A-1C.

FIG. 4 illustrates the winding magnetic-motive-force (MMF) of a single phase of the exemplary motor described relative to FIGS. 1A-1C while FIG. 5 illustrates the accumulated MMF for all coils of all three-phases. As shown in FIG. 5, the total MMF is nearly sinusoidal in nature, resulting in a reduction in flux harmonic associated losses, torque ripples and operational noises and vibrations.

Another benefit of the present invention is the ease by which the fabrication of the windings can be automated. For example, a complete set of coils for a pole can be formed using a winding bobbin and a high-speed spindle. The preformed coils can then be machine inserted into the designated slots.

Figure 6A:
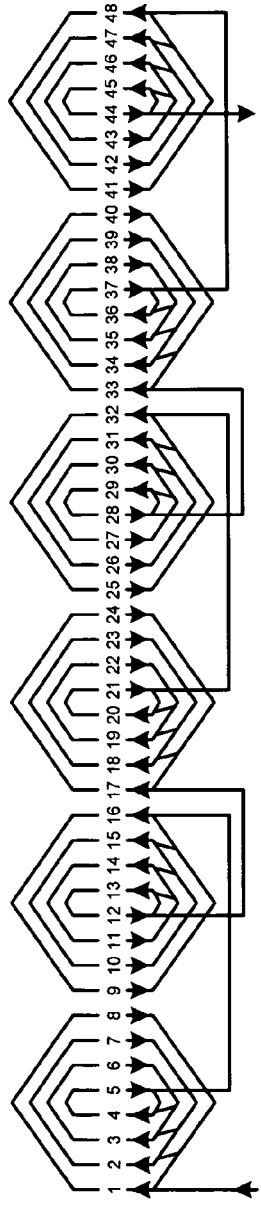
FIG. 6A illustrates the winding diagram for the first winding of a three-phase, six pole design in accordance with an alternate embodiment of the invention.
Figure 6B:
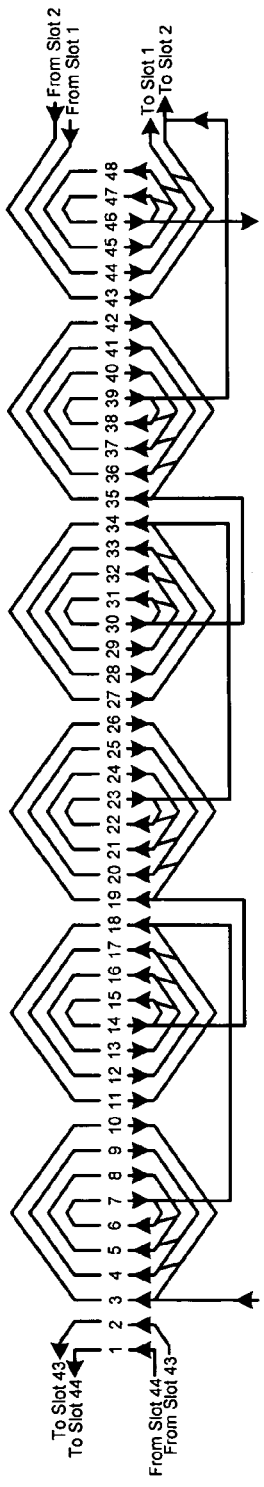
FIG. 6B illustrates the winding diagram for the second winding of a three-phase, six pole design in accordance with an alternate embodiment of the invention.
Figure 6C:
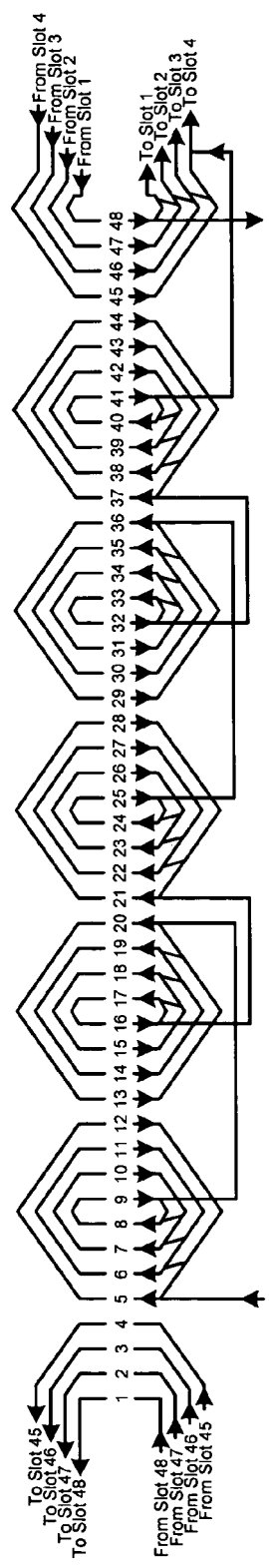
FIG. 6C illustrates the winding diagram for the third winding of a three-phase, six pole design in accordance with an alternate embodiment of the invention.
Figure 7A:
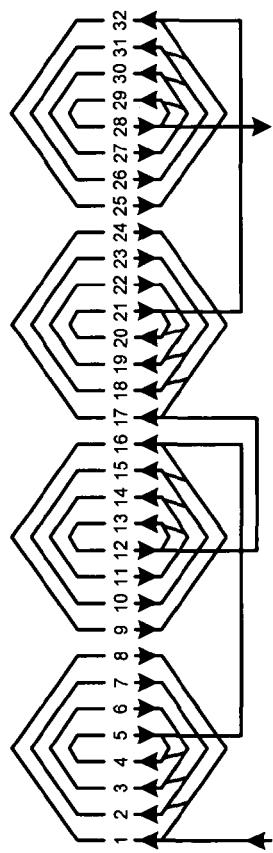
FIG. 7A illustrates the winding diagram for the first winding of a three-phase, four pole design utilizing a 32 slot stator in accordance with an alternate embodiment of the invention.
Figure 7B:
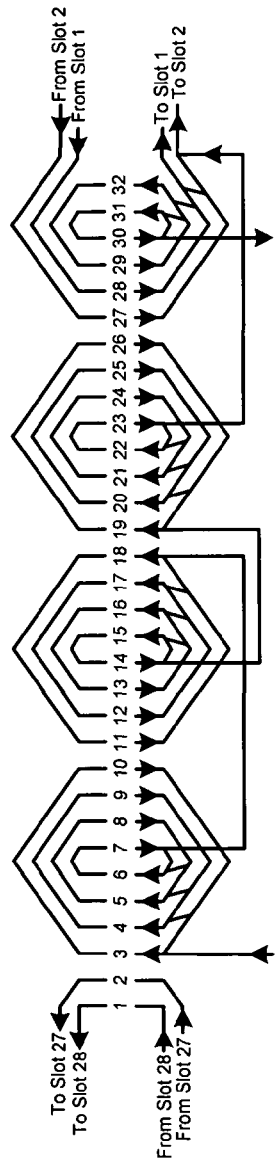
FIG. 7B illustrates the winding diagram for the second winding of a three-phase, four pole design utilizing a 32 slot stator in accordance with an alternate embodiment of the invention.
Figure 7C:
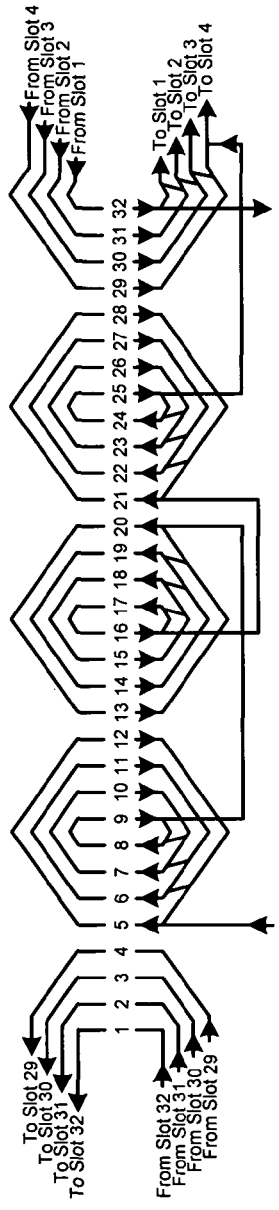
FIG. 7C illustrates the winding diagram for the third winding of a three-phase, four pole design utilizing a 32 slot stator in accordance with an alternate embodiment of the invention.

It will be appreciated that each coil may comprise one, two, three or more turns. Additionally and as previously noted, the present invention is not limited to a three-phase motor, nor is it limited to a four pole design. For example, FIGS. 6A-6C illustrate each winding layer and thus each phase, respectively, of a three-phase, six pole design in which the stator is comprised of 48 slots. Similarly, FIGS. 7A-7C illustrate each winding layer and thus each phase, respectively, of a three-phase, four pole design in which the stator is comprised of 32 slots.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. An electric motor, comprising:
a stator with a plurality of slots; and
a plurality of overlapping winding layers, wherein each of said plurality of overlapping winding layers corresponds to a phase of said electric motor, wherein each of said plurality of overlapping winding layers occupies every slot of said plurality of slots, wherein each of said plurality of overlapping winding layers is comprised of a plurality of poles, and wherein each pole of said plurality of poles is comprised of a plurality of concentric and non-overlapping coils.

2. A three-phase electric motor, comprising:
a stator with a plurality of slots;
a first winding layer corresponding to a first phase of said three-phase electric motor, wherein said first winding layer occupies every slot of said plurality of slots, wherein said first winding layer comprises a first plurality of poles, and wherein each pole of said first plurality of poles is comprised of a plurality of concentric and non-overlapping coils;
a second winding layer corresponding to a second phase of said three-phase electric motor, wherein said second winding layer occupies every slot of said plurality of slots, wherein said second winding layer comprises a second plurality of poles, and wherein each pole of said second plurality of poles is comprised of a plurality of concentric and non-overlapping coils; and
a third winding layer corresponding to a third phase of said three-phase electric motor, wherein said third winding layer occupies every slot of said plurality of slots, wherein said third winding layer comprises a third plurality of poles, and wherein each pole of said third plurality of poles is comprised of a plurality of concentric and non-overlapping coils.

3. The three-phase electric motor of claim 2, wherein a first number of poles corresponding to said first plurality of poles is equivalent to a second number of poles corresponding to said second plurality of poles and is equivalent to a third number of poles corresponding to said third plurality of poles.

4. The three-phase electric motor of claim 2, wherein said first plurality of poles corresponds to four poles, wherein said second plurality of poles corresponds to four poles, and wherein said third plurality of poles corresponds to four poles.

5. The three-phase electric motor of claim 2, wherein there is no overlap between the concentric and non-overlapping coils comprising adjacent poles of said first plurality of poles, and wherein there is no overlap between the concentric and non-overlapping coils comprising adjacent poles of said second plurality of poles, and wherein there is no overlap between the concentric and non-overlapping coils comprising adjacent poles of said third plurality of poles.

6. The three-phase electric motor of claim 2, wherein the concentric and non-overlapping coils comprising a pole of said first plurality of poles are wound in an opposite direction from the concentric and non-overlapping coils comprising an adjacent pole of said first plurality of poles, and wherein the concentric and non-overlapping coils comprising a pole of said second plurality of poles are wound in an opposite direction from the concentric and non-overlapping coils comprising an adjacent pole of said second plurality of poles, and wherein the concentric and non-overlapping coils comprising a pole of said third plurality of poles are wound in an opposite direction from the concentric and non-overlapping coils comprising an adjacent pole of said third plurality of poles.

7. The three-phase electric motor of claim 2, wherein each pole of said first plurality of poles is comprised of the same number of concentric and non-overlapping coils, wherein each pole of said second plurality of poles is comprised of the same number of concentric and non-overlapping coils, and wherein each pole of said third plurality of poles is comprised of the same number of concentric and non-overlapping coils.

8. The three-phase electric motor of claim 2, wherein each pole of said first, second and third pluralities of poles is comprised of the same number of concentric and non-overlapping coils.

9. The three-phase electric motor of claim 2, wherein the plurality of slots ($N_S$) is equal to $(2N_C)(N_P)$, where $N_C$ is equal to the number of concentric and non-overlapping coils per pole and $N_P$ is equal to number of poles per phase.

10. The three-phase electric motor of claim 9, wherein $N_C$ is an even number.

11. The three-phase electric motor of claim 2, wherein said first plurality of poles corresponds to four poles, wherein said second plurality of poles corresponds to four poles, wherein said third plurality of poles corresponds to four poles, and wherein said plurality of slots corresponds to 48 slots.

12. The three-phase electric motor of claim 2, wherein each coil of said concentric and non-overlapping coils of said first, second and third pluralities of poles is comprised of at least two turns.

\* \* \* \* \*